US007251555B2

(12) United States Patent
Kimura

(10) Patent No.: US 7,251,555 B2
(45) Date of Patent: Jul. 31, 2007

(54) EXHAUST GAS RECIRCULATION SYSTEM ABNORMALITY DIAGNOSIS DEVICE

(75) Inventor: Takahiko Kimura, Nagoya (JP)

(73) Assignee: DENSO Corporation, Kariya, Aichi-pref. (JP)

( * ) Notice: Subject to any disclaimer, the term of this patent is extended or adjusted under 35 U.S.C. 154(b) by 14 days.

(21) Appl. No.: 11/365,660

(22) Filed: Mar. 2, 2006

(65) Prior Publication Data

US 2006/0196485 A1 Sep. 7, 2006

(30) Foreign Application Priority Data

Mar. 2, 2005 (JP) ............................ 2005-058006

(51) Int. Cl.
*F02M 25/07* (2006.01)
*F02B 47/08* (2006.01)
*G06F 19/00* (2006.01)

(52) U.S. Cl. ............ 701/108; 123/568.12; 123/568.16; 701/114

(58) Field of Classification Search ........... 123/568.11, 123/568.12, 568.16, 568.21; 701/103, 108, 701/114, 115; 60/605.2; 165/41, 42, 52
See application file for complete search history.

(56) References Cited

U.S. PATENT DOCUMENTS 6,848,434 B2 * 2/2005 Li et al. ................ 123/568.12
6,866,610 B2 * 3/2005 Ito .............................. 477/43
2002/0074105 A1 * 6/2002 Hayashi et al. ............... 165/43
2006/0042608 A1 * 3/2006 Buck et al. ............ 123/568.12

FOREIGN PATENT DOCUMENTS

JP 2001193577 A * 7/2001 ................. 701/108
JP 1 347 166 A1 9/2003

* cited by examiner

*Primary Examiner*—Willis R. Wolfe, Jr.
(74) *Attorney, Agent, or Firm*—Nixon & Vanderhye P.C.

(57) ABSTRACT

An exhaust gas recirculation passage connects an exhaust passage with an intake passage. A cooling device is mounted to the exhaust gas recirculation passage for cooling exhaust gas in the exhaust gas recirculation passage. An EGR valve adjusts a flow passage area of the exhaust gas recirculation passage. An exhaust gas quantity (EGR quantity) in the exhaust gas recirculation passage is feedback-controlled by manipulating an opening degree of the EGR valve based on a measurement value of an airflow meter. Existence or nonexistence of an abnormality in the cooling device is diagnosed based on whether a measurement value of the opening degree of the EGR valve contains a component corresponding to compensation for reduction of the EGR quantity due to degradation of cooling performance of the cooling device.

17 Claims, 8 Drawing Sheets

EXHAUST GAS RECIRCULATION SYSTEM ABNORMALITY DIAGNOSIS DEVICE

CROSS REFERENCE TO RELATED APPLICATION

This application is based on and incorporates herein by reference Japanese Patent Application No. 2005-58006 filed on Mar. 2, 2005.

BACKGROUND OF THE INVENTION

1. Field of the Invention

The present invention relates to a diagnosis device for diagnosing existence or nonexistence of an abnormality in an exhaust gas recirculation system that recirculates exhaust gas discharged to an exhaust system of an internal combustion engine into an intake system.

2. Description of Related Art

A known internal combustion engine has an exhaust gas recirculation system (EGR system) for recirculating part of exhaust gas to an intake system in order to improve emission characteristics. The exhaust gas recirculation system has an exhaust gas recirculation passage for connecting an exhaust system and the intake system of the engine with each other and an EGR valve for adjusting a flow passage area of the exhaust gas recirculation passage. An EGR quantity, or a quantity of the exhaust gas recirculated to the intake system through the exhaust gas recirculation passage, is controlled by manipulating an opening degree of the EGR valve. If the exhaust gas recirculation system recirculates part of the exhaust gas to the intake system, the exhaust gas reduces combustion temperature in a combustion chamber of the engine. Accordingly, generation of nitrogen oxides in the combustion chamber is suppressed and the emission characteristics are improved.

A proposed abnormality diagnosis device (for example, a diagnosis device described in JP-A-2002-256982) for diagnosing existence or nonexistence of an abnormality in the exhaust gas recirculation system measures a change in air intake quantity or a change in pressure inside an intake system while gradually changing the opening degree of the EGR valve when an operating state of the engine is stabilized. The diagnosis device determines that an abnormality exists if the change in the air intake quantity or the change in the pressure inside the intake system is less than a predetermined threshold value. The air intake quantity or the pressure inside the intake system changes due to the change in the opening degree of the EGR valve if the exhaust gas recirculation system is normal. By using these characteristics, the above-mentioned abnormality diagnosis device diagnoses the existence or nonexistence of the abnormality.

In recent years, an exhaust gas recirculation system having a cooling device for cooling the exhaust gas in the exhaust gas recirculation passage to increase the EGR quantity is proposed, specifically, as an exhaust gas recirculation system for a diesel engine, intending to reduce a concentration of the nitrogen oxides in the exhaust gas. In this exhaust gas recirculation system, a cooling water passage is provided next to a wall of the exhaust gas recirculation passage so that the heat of the high-temperature exhaust gas in the exhaust gas recirculation passage is absorbed by cooling water. Thus, the EGR quantity can be increased.

In such an exhaust gas recirculation system, there is a possibility that solid materials such as carbon contained in the exhaust gas will accumulate in the exhaust gas recirculation passage because the exhaust gas in the exhaust gas recirculation passage is cooled by the cooling device. There is a possibility that the accumulation quantity of the solid materials will increase and the cooling function will be significantly degraded while the exhaust gas recirculation system is used for a long time.

The degradation of the cooling performance of the cooling device will cause reduction of the EGR quantity. The reduction of the EGR quantity due to the degradation of the cooling performance cannot be compensated for if the EGR quantity is controlled by open-loop control. The reduction in the EGR quantity due to the degradation of the cooling performance of the cooling device can be inhibited by adjusting the opening degree of the EGR valve if the exhaust gas recirculation system feedback-controls the EGR quantity. However, also in this case, a sufficient quantity of the exhaust gas cannot be recirculated under an operating condition in which a large EGR quantity is required.

SUMMARY OF THE INVENTION

It is therefore an object of the present invention to provide an abnormality diagnosis device of an exhaust gas recirculation system capable of appropriately diagnosing degradation of cooling performance of a cooling device.

According to an aspect of the present invention, an abnormality diagnosis device of an exhaust gas recirculation system has a target value setting device, a standard value storing device, a measuring device, a calculating device, and a diagnosing device. The exhaust gas recirculation system recirculates exhaust gas, which is discharged to an exhaust system of an internal combustion engine, into an intake system. The exhaust gas recirculation system has an actuator for adjusting a quantity of the recirculated exhaust gas and a cooling device for cooling the recirculated exhaust gas. The target value setting device sets a target value of one of the quantity of the recirculated exhaust gas, a state quantity of fresh air suctioned from the intake system and a state quantity of the exhaust gas discharged to the exhaust system in accordance with each one of operation areas of the engine. The standard value storing device stores a standard value of a manipulated variable of the actuator corresponding to the operation area of the engine and the target value. The measuring device measures one of the quantity of the recirculated exhaust gas, the state quantity of the fresh air and the state quantity of the exhaust gas. The calculating device calculates a deviation between a measurement value of the measuring device and the target value. The diagnosing device diagnoses existence or nonexistence of an abnormality in the cooling device based on comparison between the manipulated variable, which is provided when the actuator is manipulated such that the deviation is less than a predetermined threshold value, and the standard value corresponding to the operation area of the engine, in which the manipulation of the actuator is performed in such a way.

In the above structure, the quantity of the recirculated exhaust gas, the state quantity of fresh air suctioned from the intake system or the state quantity of the exhaust gas discharged to the exhaust system is feedback-controlled to the target value. The value feedback-controlled to the target value is the quantity of the recirculated exhaust gas itself or the quantity correlating with the quantity of the recirculated exhaust gas. Therefore, the quantity of the recirculated exhaust gas is directly or indirectly feedback-controlled to the target value through the manipulation of the actuator. In this structure, if the quantity of the recirculated exhaust gas is reduced due to degradation of cooling performance of the cooling device, the manipulated variable of the actuator will be changed to compensate for the reduction of the quantity of the recirculated exhaust gas. At this time, the manipulated variable contains a component corresponding to the compensation for the reduction of the quantity of the recirculated exhaust gas due to the degradation of the cooling performance. That is, if the manipulated variable of the actuator based on the assumption that the cooling performance of the cooling device is not degraded is used as the standard value, the manipulated variable provided through the feedback control will differ from the corresponding standard value.

Therefore, in this structure, the existence or nonexistence of the abnormality in the cooling performance can be diagnosed appropriately. Specifically, in the case where the measuring device measures the state quantity of the fresh air or the exhaust gas, no additional part dedicated to the diagnosis is necessary.

According to another aspect of the present invention, an abnormality diagnosis device of the exhaust gas recirculation system has a target value setting device, a standard value storing device, a measuring device, a calculating device, and a diagnosing device. The target value setting device sets a target value of one of the quantity of recirculated exhaust gas, the state quantity of the fresh air suctioned from the intake system and the state quantity of the exhaust gas discharged to the exhaust system in accordance with each one of the operation areas of the engine. The standard value storing device stores a standard value of the manipulated variable of the actuator corresponding to the operation area of the engine and the target value. The measuring device measures one of the quantity of the recirculated exhaust gas, the state quantity of the fresh air and the state quantity of the exhaust gas. The calculating device calculates a deviation between the measurement value of the measuring device and the target value. The diagnosing device diagnoses existence or nonexistence of an abnormality in the cooling device based on the deviation that is calculated when the actuator is manipulated to conform the manipulated variable of the actuator to the standard value corresponding to the operation area of the engine.

In this structure, the deviation between the quantity of the recirculated exhaust gas, the state quantity of the fresh air suctioned from the intake system or the state quantity of the exhaust gas discharged to the exhaust system and the target value is calculated. Thus, the deviation between the quantity of the recirculated exhaust gas itself or the quantity correlated with the quantity of the recirculated exhaust gas and the target value is calculated. Therefore, the deviation between the quantity of the recirculated exhaust gas and the target value is calculated directly or indirectly. If the cooling performance of the cooling device is degraded, the quantity of the exhaust gas recirculated into the intake system reduces. Accordingly, the quantity of the recirculated exhaust gas becomes less than the target quantity. At that time, if the actuator is manipulated to conform the manipulated variable of the actuator to the standard value, the measurement value of one of the quantity of the recirculated exhaust gas, the state quantity of the fresh air suctioned from the intake system and the state quantity of the exhaust gas discharged to the exhaust system will deviate from the target value.

Accordingly, in the above-mentioned structure, the existence or nonexistence of the abnormality in the cooling performance can be diagnosed appropriately. Specifically, in the case where the measuring device measures the state quantity of the fresh air or the exhaust gas, no additional measuring device dedicated to the diagnosis is necessary.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

Figure 1:
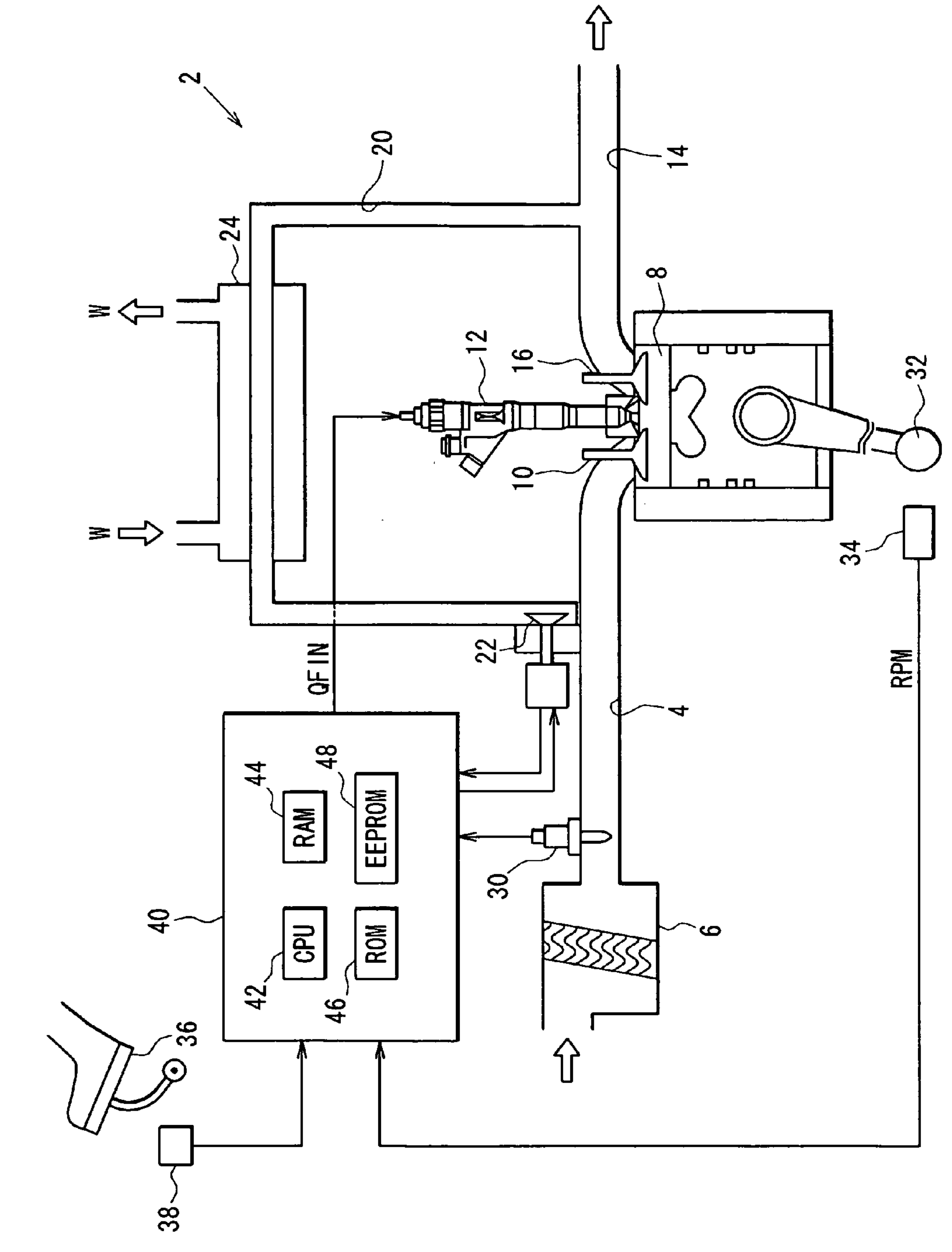
FIG. 1 is a schematic diagram showing an abnormality diagnosis device of an exhaust gas recirculation system according to a first example embodiment of the present invention.

Referring to FIG. 1, an abnormality diagnosis device of an exhaust gas recirculation system according to a first example embodiment applied to an abnormality diagnosis device of an exhaust gas recirculation system of a diesel engine is illustrated.

FIG. 1 shows an entire structure of the abnormality diagnosis device of the exhaust gas recirculation system (EGR system) and a diagnosis object according to the first example embodiment.

As shown in FIG. 1, an air cleaner 6 is located upstream of an intake passage 4 of an internal combustion engine 2. The intake passage 4 is connected with a combustion chamber 8 of the engine 2 if an intake valve 10 is opened. A fuel injection valve 12 is located in the combustion chamber 8 so that the fuel injection valve 12 protrudes into the combustion chamber 8. The combustion chamber 8 is connected with an exhaust passage 14 if an exhaust valve 16 is opened.

The exhaust passage 14 communicates with the intake passage 4 through an exhaust gas recirculation passage 20. An EGR valve 22 for regulating a flow passage area of the exhaust gas recirculation passage 20 is located in the exhaust gas recirculation passage 20 at a connection between the exhaust gas recirculation passage 20 and the intake passage 4. The EGR valve 22 incorporates a sensor for measuring an opening degree of the EGR valve 22 and for outputting a measurement value.

The exhaust gas recirculation passage 20 is provided for recirculating exhaust gas in the exhaust passage 14 to the intake passage 4. A cooling device 24 for cooling the exhaust gas in the exhaust gas recirculation passage 20 is mounted to the exhaust gas recirculation passage 20. The cooling device 24 has a cooling water passage located next to the exhaust gas recirculation passage 20. Cooling water (W) flows through the cooling water passage along the exhaust gas recirculation passage 20 from one side (for example, a downstream side) to the other side (for example, an upstream side) of the exhaust gas recirculation passage 20. Heat of the exhaust gas in the exhaust gas recirculation passage 20 is absorbed by the cooling water W through a wall of the exhaust gas recirculation passage 20. Thus, the exhaust gas is cooled. Since the exhaust gas is cooled, the quantity (EGR quantity) of the exhaust gas recirculated through the exhaust gas recirculation passage 20 is increased.

The exhaust gas recirculation system as the diagnosis object of this example embodiment includes the exhaust gas recirculation passage 20, the EGR valve 22 and the cooling device 24.

Sensors for measuring the states of various points of the engine 2 include the sensor incorporated in the EGR valve 22, an airflow meter 30 for measuring the intake quantity of the air taken into the intake passage 4, a crank sensor 34 for measuring rotation speed RPM of a crankshaft as an output shaft of the engine 2, and the like. The output of the engine 2 is increased or decreased through pressing operation of an accelerator pedal 36 performed by a user. An accelerator sensor 38 measures the pressed degree of the accelerator pedal 36. Measurement values of the various sensors are input to an electronic control device 40 that controls output characteristics of the engine 2. The electronic control device 40 includes a central processing unit (CPU) 42, a random access memory (RAM) 44, a read only memory (ROM) 46, an electrically erasable and programmable read only memory (EEPROM) 48 and the like. The electronic control device 40 manipulates various actuators such as the EGR valve 22 and the fuel injection valve 12 based on the measurement values of the various sensors.

The electronic control device 40 controls the EGR quantity by manipulating the EGR valve 22 in order to maintain good emission characteristics as the output characteristics of the engine (diesel engine) 2. The EGR quantity is indirectly feedback-controlled through feedback control of the intake quantity.

Figure 2:
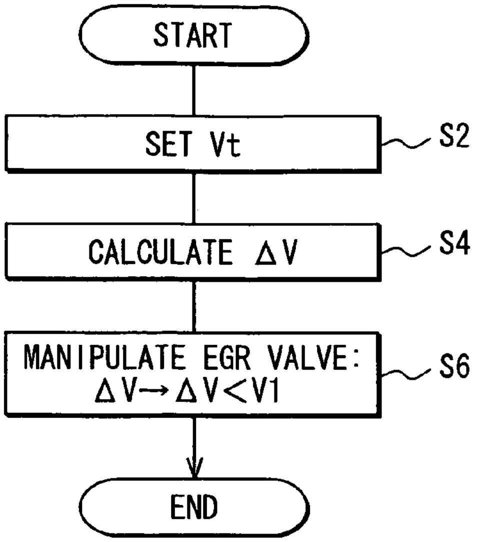
FIG. 2 is a flowchart showing processing steps of feedback control of intake quantity (EGR quantity) according to the first example embodiment.

A flowchart shown in FIG. 2 illustrates processing steps of the above-mentioned feedback control. The electronic control device 40 repeatedly executes the processing of FIG. 2 in a predetermined cycle, for instance.

First, in the series of processing, Step S2 sets a target value Vt of the intake quantity corresponding to the operation area of the engine 2 specified based on the rotation speed RPM and fuel injection quantity QFIN of the engine 2 and the like. The target value Vt of the intake quantity of the specified operation area is adjusted and stored in the electronic control device 40 in advance. That is, the target values Vt are obtained through experimentation and the like and stored in the electronic control device 40 in advance. Then, Step S4 calculates a deviation ΔV between the measurement value and the target value Vt of the intake quantity. Step S6 manipulates the EGR valve 22 to control the deviation ΔV below a predetermined threshold value V1. If the processing of Step S6 is completed, the series of processing is ended once.

The intake quantity correlates with the EGR quantity. It is estimated that the EGR quantity is greater than an intended quantity if the measurement value of the airflow meter 30 is smaller than the target value Vt in a certain operation area. It is estimated that the EGR quantity is smaller than the intended quantity if the measurement value is greater than the target value Vt in the same operation area. Through this control, the EGR quantity is indirectly feedback-controlled. That is, the EGR quantity is indirectly feedback-controlled to the intended quantity by feedback-controlling the measurement value of the airflow meter 30 to the target value Vt.

Figure 3:
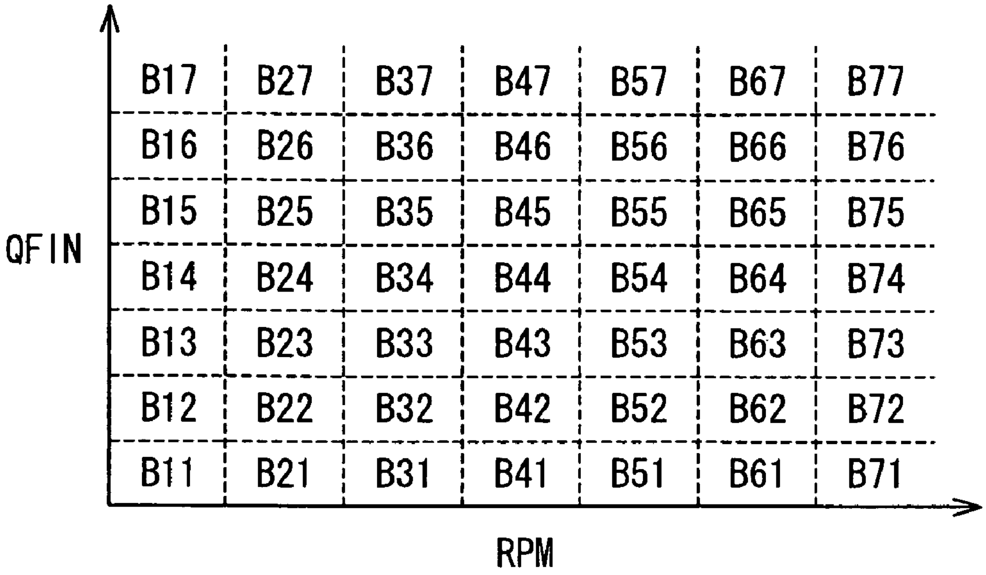
FIG. 3 is a diagram showing operation areas based on map data for open-loop control of an EGR valve according to the first example embodiment.

In this example embodiment, open-loop control of the EGR quantity is performed when the above-mentioned feedback control cannot be executed due to a failure of the airflow meter 30, for example. The open-loop control is performed by setting a manipulated variable of the EGR valve 22 based on a two-dimensional map shown in FIG. 3. The two-dimensional map shown in FIG. 3 determines the opening degree of the EGR valve 22 for each operation area defined by the rotation speed RPM and the injection quantity QFIN. For example, in an operation area B11 shown in FIG. 3 where the rotation speed RPM and the fuel injection quantity QFIN of the engine 2 are the smallest, the manipulated variable of the EGR valve 22 is set based on the opening degree of the EGR valve 22 set in the operation area B11. The opening degree may be directly used as the manipulated variable of the EGR valve 22. The opening degree modified in accordance with the cooling water temperature of the engine 2 and the like may be used as the manipulated variable of the EGR valve 22. Thus, the EGR quantity can be controlled even when the feedback control cannot be executed. The opening degree of the EGR valve 22 set based on the map data shown in FIG. 3 is set at a value suitable for approximating the measurement value of the intake air to the target value Vt when there is no abnormality in the exhaust gas recirculation system.

In this example embodiment, the two-dimensional map is used not only in the above-mentioned open-loop control but also in the feedback control of the intake quantity. That is, in the feedback control according to this example embodiment, the open-loop control of the EGR quantity is performed once with the use of the above-mentioned two-dimensional map, and the feedback control is performed to compensate for a difference between the intended EGR quantity and the actual EGR quantity. Thus, the opening degree of the EGR valve 22 based on the two-dimensional map is finely adjusted by the feedback control of the intake quantity.

Since the exhaust gas is rapidly cooled in the exhaust gas recirculation passage 20, solid materials such as carbon contained in the exhaust gas can attach to the inner side of the exhaust gas recirculation passage 20 and accumulate inside the exhaust gas recirculation passage 20. The cooling performance of the cooling device 24 for cooling the exhaust gas in the exhaust gas recirculation passage 20 will be degraded if the solid materials accumulate in the exhaust gas recirculation passage 20. The EGR quantity (mass flow rate: mass of the exhaust gas recirculated through the exhaust gas recirculation passage 20) will be reduced for the opening degree of the EGR valve 22 if the cooling performance of the cooling device 24 is degraded. In this example embodiment, the EGR quantity is indirectly feedback-controlled through the feedback control of the intake quantity. Therefore, operation for increasing the opening degree of the EGR valve 22 is executed to increase the EGR quantity if the EGR quantity decreases due to the degradation of the cooling performance of the cooling device 24. However, there is a possibility that the degradation of the cooling performance of the cooling device 24 cannot be compensated for through the operation of the EGR valve 22 in the case where the required EGR quantity is large. If the feedback control is continued under such a situation, characteristics of the exhaust gas discharged outward through the exhaust passage 14 will be deteriorated.

Therefore, in this example embodiment, existence or nonexistence of an abnormality in the cooling device 24 is diagnosed based on a phenomenon in which the EGR quantity changes due to the degradation of the cooling performance of the cooling device 24.

As explained above, the opening degree of the EGR valve 22 as a manipulated variable of the feedback control is changed in order to compensate for the decrease in the EGR quantity if the EGR quantity decreases due to the degradation of the cooling performance of the cooling device 24. Thus, the opening degree of the EGR valve 22 at that time contains a component corresponding to the compensation for the change in the EGR quantity. Therefore, in this example embodiment, the existence or nonexistence of the abnormality in the cooling device 24 is determined based on whether the opening degree of the EGR valve 22 contains a component corresponding to the compensation for the change in the EGR quantity caused by the degradation of the cooling performance.

For example, the existence or nonexistence of the abnormality in the cooling device 24 is diagnosed based on comparison between a standard value of the opening degree of the EGR valve 22, which corresponds to the operation area of the engine 2 and to the target value Vt of the feedback control of the intake quantity shown in FIG. 2, and the actual opening degree of the EGR valve 22. The standard value is set at a suitable value for conforming the intake quantity to the corresponding target value Vt when the cooling performance of the cooling device 24 is normal. The existence or nonexistence of the abnormality is diagnosed based on whether the actual opening degree of the EGR valve 22 is greater than the standard value by at least a predetermined threshold value. The threshold value is intended for determining whether the opening degree of the EGR valve 22 (measurement value of the opening degree of the EGR valve 22) as the manipulated variable of the feedback control contains the component corresponding to the compensation for the reduction of the EGR quantity caused by the degradation of the cooling performance of the cooling device 24.

The opening degree of the EGR valve 22 determined based on the map data used in the open-loop control can be used as the standard value. However, in this case, a margin taking into account an individual difference of the exhaust gas recirculation system or the engine 2 is added to a condition for determining that the abnormality exists. Therefore, redundancy accompanies the condition for performing the determination.

In order to avoid the redundancy, in this example embodiment, the opening degree of the EGR valve 22 provided in the feedback control is measured for each one of multiple learning operation areas of the engine 2, and the measurement value (learning value) is set as the standard value.

Figure 4:
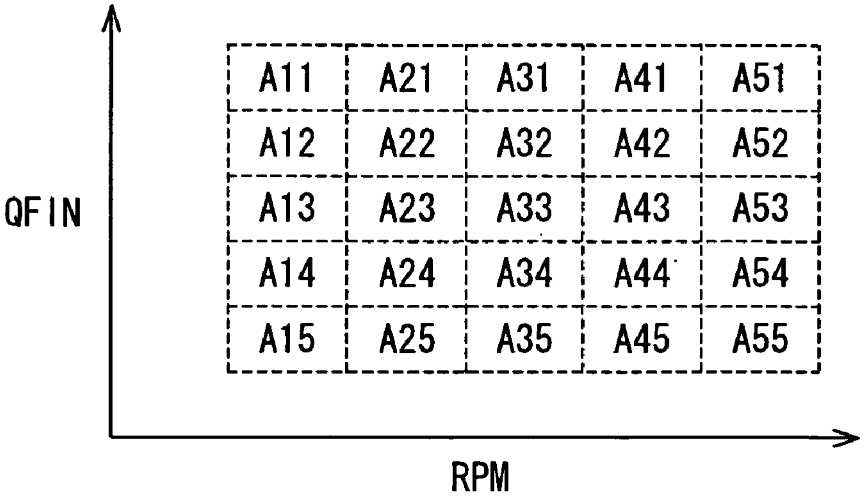
FIG. 4 is a diagram showing operation areas having learning values used in abnormality diagnosis according to the first example embodiment.

The multiple learning operation areas are shown in FIG. 4. In FIG. 4, a predetermined operation area in the operation area determined by the rotation speed RPM and the fuel injection quantity QFIN is divided into multiple learning operation areas Aij. In the multiple learning operation areas Aij (for example, twenty five areas A11-A55 in FIG. 4), the opening degree of the EGR valve 22 is equal to or greater than a predetermined value that is greater than zero. Through this setting, areas providing good response of the airflow meter 30 with respect to the degradation of the cooling performance (preferably, areas in which the opening degree of the EGR valve 22 is significantly changed by the degradation of the cooling performance) can be easily specified. In an area where the response is poor, the change in the measurement value of the airflow meter 30 with respect to the degradation of the cooling performance is small. Therefore, the change in the opening degree of the EGR valve 22 for compensating for the degradation of the cooling performance is small and is difficult to measure appropriately. The change in the measurement value of the airflow meter 30 due to the degradation of the cooling performance is relatively prominent in the area where the opening degree of the EGR valve 22 is equal to or greater than the predetermined value when the exhaust gas recirculation system is normal. Therefore, in this example embodiment, the areas in which the opening degree of the EGR valve 22 is equal to or greater than the predetermined value are used to suitably determine whether the measurement value of the opening degree of the EGR valve 22 contains a component corresponding to the compensation for the degradation of the cooling performance.

Out of the operation areas shown in FIG. 3 defined by the rotation speed RPM and the fuel injection quantity QFIN, the operation areas, in which the opening degree of the EGR valve 22 is equal to or greater than the predetermined value, are set as the learning operation areas Aij. For example, an area B22 shown in FIG. 3 coincides with an area A15 shown in FIG. 4. An area B66 shown in FIG. 3 coincides with an area A51 shown in FIG. 4.

Figure 5:
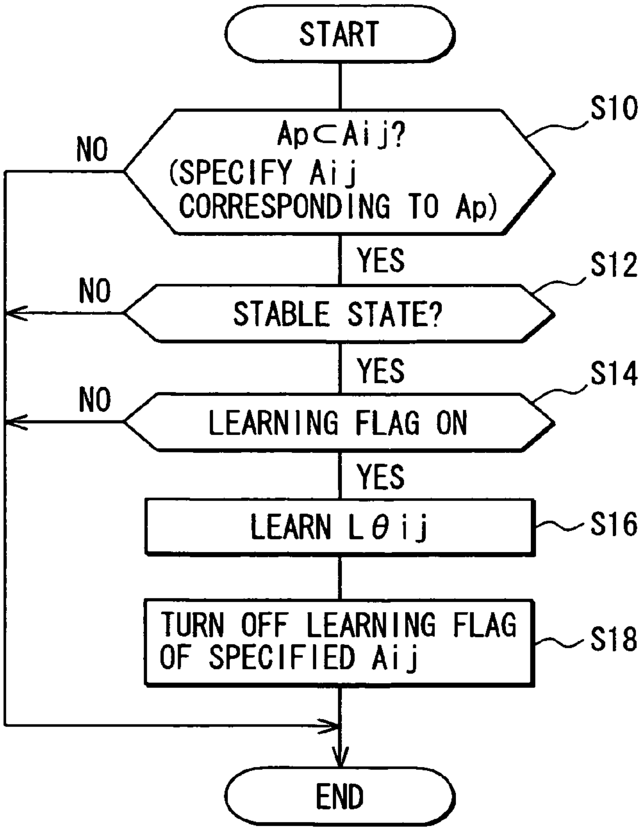
FIG. 5 is a flowchart showing processing steps of obtaining the learning value according to the first example embodiment.

A flowchart of processing steps of the learning operation of the opening degree of the EGR valve 22 according to this example embodiment is shown in FIG. 5. The electronic control device 40 executes the processing steps of FIG. 5 in a predetermined cycle, for example.

First, in this series of processing, Step S10 determines whether a present operation area Ap defined by the rotation speed RPM and the fuel injection quantity QFIN of the engine 2 is included in the areas Aij shown in FIG. 4. If Step S10 determines that the present operation area Ap is included in the areas Aij shown in FIG. 4, the area Aij corresponding to the present operation area Ap is specified (for example, suffixes i, j of the area Aij corresponding to the present operation area Ap are specified). Then, Step S12 determines whether the operating state of the engine 2 is stable. This determination is performed to obtain a learning value of the opening degree of the EGR valve 22 in an area in which the measurement value of the airflow meter 30 (or the EGR quantity) is stationary. For example, it may be determined that the operating state of the engine 2 is stable if the change in the rotation speed RPM of the engine 2 is equal to or less than a predetermined value and the change in the fuel injection quantity QFIN is equal to or less than another predetermined value.

Following Step S14 determines whether a learning flag is ON. The learning flag is set for each area Aij shown in FIG. 4. The learning flags of all the areas Aij are ON when the electromagnetic control device 40 is manufactured.

If Step S14 determines that the learning flag of the area Aij specified at Step S10 is ON, Step S16 learns the present measurement value of the opening degree of the EGR valve 22 as the learning value Lθij. Thus-learned learning value Lθij is stored in a non-volatile memory such as EEPROM 46 shown in FIG. 1 that stores and keeps the data independently of energization or deenergization of the electronic control device 40.

In practice, the value of the stored data is not the measurement value of the opening degree of the EGR valve 22 measured at Step 16 but a value provided by subtracting the value of the map data used in the open-loop control from the measurement value. This processing corresponds to the feedback control using the map data for the open-loop control in this example embodiment.

If the processing of Step S16 is completed, Step S18 turns off the learning flag of the area Aij specified at Step S10 (learning flag determined to be ON at Step S14).

The series of processing is ended once if Step S10 determines that the present operation area Ap is not included in the operation areas Aij shown in FIG. 4, if Step S12 determines that the engine 2 is out of the stable state, if Step S14 determines that the learning flag is OFF, or if the processing at Step S18 is completed.

Normally, this processing is performed when the engine 2 is operated in a factory and the like before the engine 2 is shipped. However, at this time, the learning values Lθij of all the areas Aij shown in FIG. 4 cannot be necessarily obtained. In such a case, the remaining learning values Lθij may be obtained when the vehicle mounted with the engine 2 is actually operated by the user after the engine 2 is shipped. The learning operation should be preferably performed under a predetermined condition that the cooling performance of the cooling device can be assumed to be normal, for example, within a predetermined period after the start of the use of the exhaust gas recirculation system. In any cases, the series of processing shown in FIG. 5 should not preferably be started after the learning values Lθij of all the areas Aij shown in FIG. 4 are obtained. Thus, a computing load of the electronic control device 40 can be alleviated.

Even after all the learning flags are turned off once, the learning values Lθij should be preferably renewed by turning on all the learning flags again when parts of the exhaust gas recirculation system or the engine 2 such as EGR valve 22 are replaced. Thus, a change in the individual difference of the exhaust gas recirculation system or the engine 2 due to the replacement of the parts can be reflected in the learning values Lθij. In the case where the learning values Lθij are renewed when the parts are replaced, it should be tested beforehand whether the cooling performance of the cooling device 24 has been degraded. If the cooling performance has been degraded, the cooling performance should be recovered.

Next, diagnosis processing of the degradation of the cooling performance of the cooling device 24 will be explained with reference to FIG. 6. The electronic control device 40 executes processing steps of a flowchart shown in FIG. 6 in a predetermined cycle, for example.

First, in this series of processing, Step S20 determines whether the present operation area Ap defined by the rotation speed RPM and the fuel injection quantity QFIN of the engine 2 is included in the learning operation areas Aij shown in FIG. 4. If it is determined that the present operation area Ap is included in the learning operation areas Aij, the area Aij corresponding to the present operation area Ap is specified. Then, Step S22 determines whether the operating state of the engine 2 is stable like Step S12 of the flowchart shown in FIG. 5. If Step S22 determines that the operating state is stable, the processing proceeds to Step S24.

Step S24 determines whether the measurement value θ of the opening degree of the EGR valve 22 is greater than the opening degree (learning value Lθij) of the EGR valve 22 learned through the processing shown in FIG. 5 by at least a threshold value Δθij. Through this determination, it is determined whether the opening degree of the EGR valve 22 contains a component corresponding to the compensation for the degradation of the cooling performance of the cooling device 24.

Figure 7:
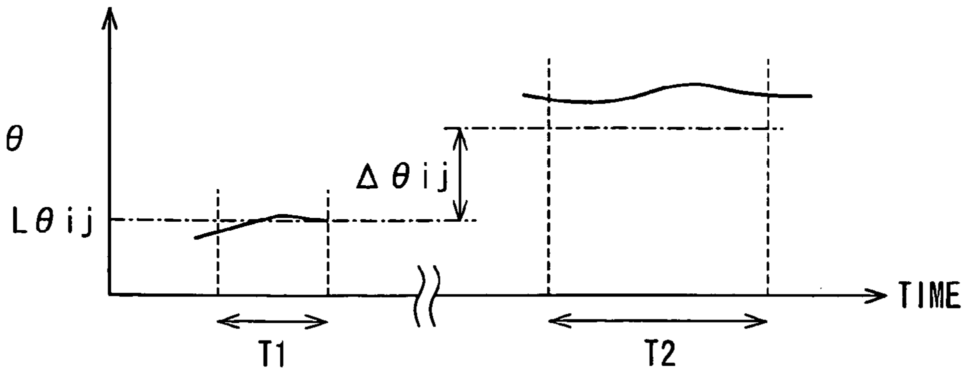
FIG. 7 is a time chart showing a mode of the abnormality diagnosis according to the first example embodiment.

If the cooling performance of the cooling device 24 is degraded, the reduction in the EGR quantity caused by the degradation is compensated for through the feedback control, and the operation for increasing the opening degree of the EGR valve 22 is performed. Therefore, the opening degree of the EGR valve 22 at the time when the cooling performance is degraded is larger than the opening degree at the time when the cooling performance is not degraded. For example, in FIG. 7, the learning operation of the opening degree of the EGR valve 22 is performed in a time T1. If the cooling performance is degraded after the learning operation, the measurement value θ of the opening degree of the EGR valve 22 becomes greater than the learning value Lθij as shown in a time T2.

Therefore, in this example embodiment, the degradation of the cooling performance is detected if the measurement value θ of the opening degree of the EGR valve 22 is greater than the learning value Lθij of the corresponding area Aij by at least the threshold value Δθij. The threshold value Δθij is intended for excluding the cases in which the measurement value θ of the opening degree of the EGR valve 22 becomes greater than the corresponding learning value Lθij because of other reasons such as a noise contained in the output of the airflow meter 30 than the degradation of the cooling performance. A suitable threshold value Δθij may be set for each learning operation area Aij shown in FIG. 4 independently.

The above-mentioned comparison may be performed between a present value of a difference, which is provided by subtracting an opening degree determined based on the map data used in the open-loop control from the opening degree of the EGR valve 22, and a value of the same provided at the time when the learning value Lθij is obtained.

If Step S24 determines that the opening degree of the EGR valve 22 is greater than the learning value Lθij by at least the threshold value Δθij, Step S26 stores a content that the difference between the measurement value θ of the opening degree of the EGR valve 22 and the learning value Lθij exceeds the threshold value Δθij ($\theta - L\theta ij > \Delta\theta ij$) in the area Aij specified by Step S20. The content should be preferably stored in a non-volatile memory such as EEPROM 46 that stores the contents independently of the energization or deenergization of the electronic control device 40. Alternatively, the content may be stored in a volatile memory such as RAM 44 that keeps the content while the electronic control device 40 is energized. Step S26 counts the number Nex of the areas Aij where the difference between the measurement value θ of the opening degree of the EGR valve 22 and the learning value Lθij has exceeded the threshold value Δθij up to now.

If the processing at Step S26 is completed, the processing proceeds to Step S28. Step S28 determines whether a ratio of the number Nex of the learning operation areas Aij counted at Step S26 to the total number Nt of the learning operation areas Aij shown in FIG. 4 is greater than a determination threshold value Rt. If the ratio Nex/Nt is greater than the determination threshold value Rt, Step S30 determines that an abnormality exists in the cooling device 24 (the cooling performance is degraded).

The reason why the measurement value θ of the opening degree of the EGR valve 22 exceeds the learning value Lθij is not limited to the degradation of the cooling performance. Therefore, it is determined that the cooling performance is degraded if the ratio Nex/Nt exceeds the determination threshold value Rt. For example, in the case where an abnormality is generated in the EGR valve 22 and the like, there is a possibility that an abnormality is generated in the EGR quantity (manipulated variable of the operation of the EGR valve 22) only at a predetermined opening degree. For example, when the EGR valve 22 is operated, there is a possibility that the EGR valve 22 is not operated normally only at a certain opening degree and the EGR quantity as the manipulated variable does not coincide with an intended value. In such a case, the measurement value θ of the opening degree of the EGR valve 22 can become greater than the learning value Lθij by at least a predetermined value only in a certain area. Instead of using a measurement value of a manipulation command value of the EGR valve 22 as the measurement value of the opening degree of the EGR valve 22, the measurement value of the sensor incorporated in the EGR valve 22 may be used. Thus, the above-mentioned problem can be suitably averted. However, even in this case, the problem cannot be solved if an abnormality is generated in the sensor, for instance.

In contrast, in the case where an abnormality is generated in the cooling performance of the cooling device 24, the measurement value θ of the opening degree of the EGR valve 22 can become greater than the learning value Lθij by at least a predetermined value substantially in all areas. Therefore, in this example embodiment, the determination threshold value Rt is suitably set to determine the abnormality in the cooling device 24 while excluding the cases in which the measurement value θ of the opening degree of the EGR valve 22 becomes greater than the learning value Lθij by at least a predetermined value due to other abnormalities than the abnormality in the cooling device 24.

The series of processing is ended once if Step S20 determines that the present operation area Ap is not included in the learning operation areas Aij shown in FIG. 4, if Step S22 determines that the operating state of the engine 2 is unstable, if Step S24 determines that the opening degree of the EGR valve 22 is not greater than the learning value Lθij by the threshold value Δθij, if Step S28 determines that the ratio Nex/Nt is equal to or less than the determination threshold value Rt, or if the processing at Step S30 is completed.

Thus, in this example embodiment, the existence or nonexistence of the degradation of the cooling performance can be suitably diagnosed based on the change in the EGR quantity due to the degradation of the cooling performance of the cooling device 24. Specifically, in this example embodiment, the existence or nonexistence of the degradation of the cooling performance is diagnosed based on whether the opening degree of the EGR valve 22 as the manipulated variable of the indirect feedback control of the EGR quantity contains the component corresponding to the compensation for the reduction of the EGR quantity due to the degradation of the cooling performance. Therefore, no additional part for the diagnosis is necessary.

Figure 8:
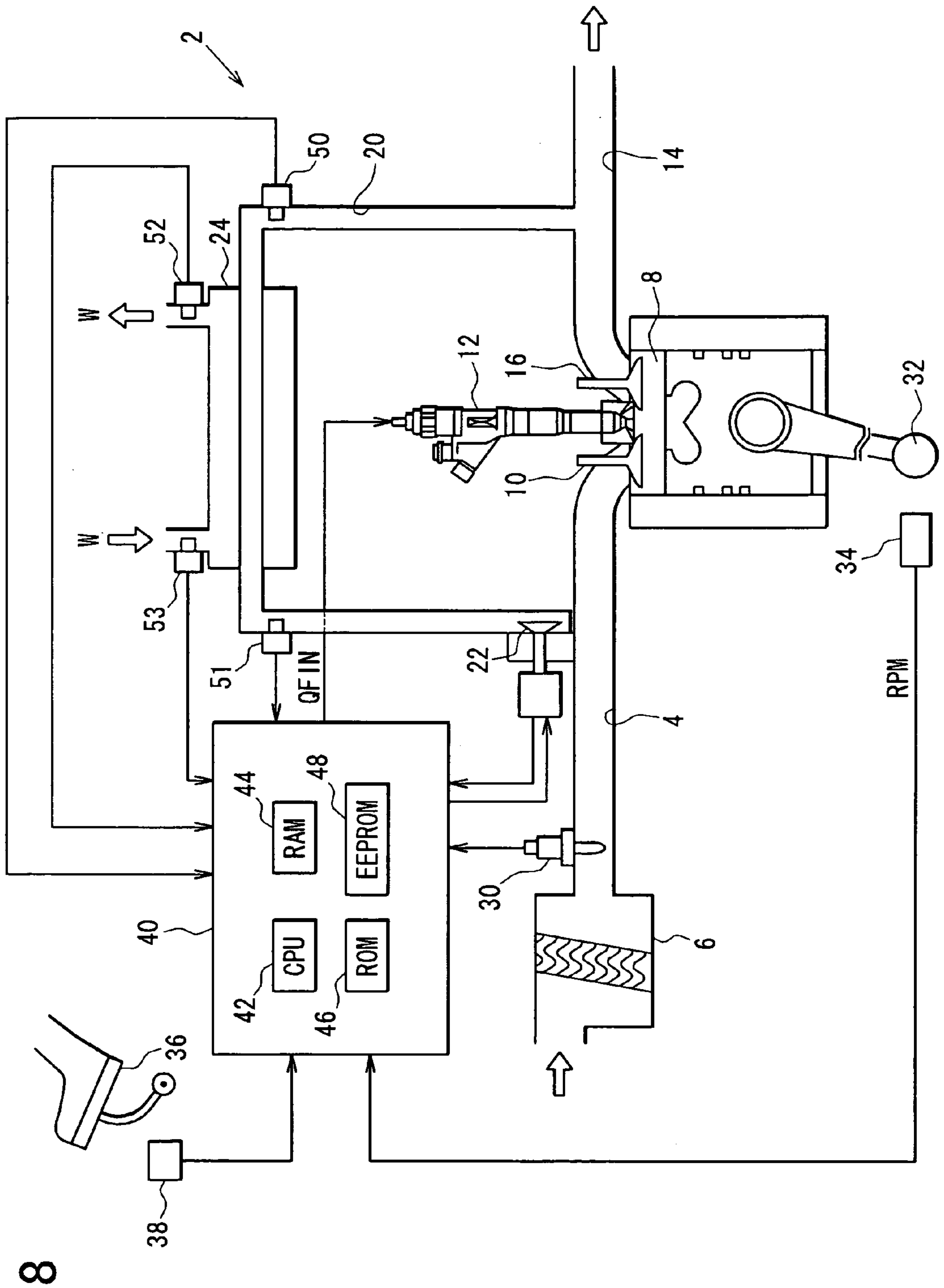
FIG. 8 is a diagram showing an abnormality diagnosis device of an exhaust gas recirculation system of a comparative example.

A structure using sensors for measuring the temperature of the cooling water W of the cooling device 24 or sensors for measuring the temperature of the exhaust gas in the exhaust gas recirculation passage 20 to diagnose the degradation of the cooling performance of the cooling device 24 is shown in FIG. 8. FIG. 8 illustrates a structure of a device for diagnosing existence or nonexistence of an abnormality in the cooling device 24 with the use of the sensors and a diagnosis object.

As shown in FIG. 8, gas temperature sensors 50, 51 are located in the exhaust gas recirculation passage 20 upstream and downstream of an area contacting the cooling device 24. In this case, it is determined that an abnormality exists in the cooling device 24 (cooling performance is degraded) if a temperature difference measured by the gas temperature sensors 50, 51 is less than a temperature difference between an upstream side and a downstream side of the exhaust gas recirculation passage 20 in an initial state, in which the cooling device 24 has normal cooling performance, by at least a predetermined value.

Alternatively, water temperature sensors 52, 53 for measuring cooling water temperature may be located in the cooling device 24 upstream and downstream of the area contacting the exhaust gas recirculation passage 20. In this case, it is determined that an abnormality exists in the cooling device 24 (cooling performance is degraded) if a temperature difference measured by the water temperature sensors 52, 53 is less than a temperature difference between an upstream side and a downstream side of the cooling device 24 in the initial state, in which the cooling device 24 has normal cooling performance, by at least a predetermined value.

In the case where the diagnosis is performed like this, only the pair of gas temperature sensors 50, 51 or the pair of water temperature sensors 52, 53 may be provided. In FIG. 8, both pairs of gas temperature sensors 50, 51 and water temperature sensors 52, 53 are shown for the sake of convenience. In the case where the diagnosis is performed like this, the number of the parts is increased because at least one of the pair of gas temperature sensors 50, 51 and the pair of water temperature sensors 52, 53 is additionally provided for the diagnosis. Moreover, the diagnosis cannot be performed appropriately when an abnormality is generated in the sensors. Usually, there is no means for diagnosing the abnormalities in the parts newly added for the diagnosis. Therefore, this problem is serious.

In contrast, in this example embodiment, the existence or nonexistence of the abnormality is diagnosed based on the manipulated variable of the feedback control as explained above, so this problem can be averted.

The above-explained example embodiment can exert following effects.

(1) The existence or nonexistence of the abnormality in the cooling device 24 is diagnosed based on the comparison between the actual opening degree of the EGR valve 22 and the standard value. Thus, the existence or nonexistence of the abnormality in the cooling device 24 can be diagnosed appropriately. No additional measuring device dedicated to the diagnosis is necessary.

(2) The value Lθij learned as the opening degree of the EGR valve 22 for each learning operation area Aij of the engine 2 is employed as the standard value. It is determined that the abnormality exists if the measurement value θ of the opening degree of the EGR valve 22 is greater than the standard value by at least the predetermined threshold value Δθij. Thus, the diagnosis of the existence or nonexistence of the abnormality can be performed without setting a margin in the predetermined threshold value Δθij in consideration of an individual difference. As a result, the abnormality can be detected in its early stage.

(3) It is determined that the abnormality exists in the cooling device 24 if the number Nex of the learning operation areas Aij, in which the measurement values θ of the opening degree of the EGR valve 22 are greater than the corresponding learning values Lθij by at least the threshold value Δθij, is greater than a predetermined value. Thus, the abnormality in the cooling device 24 can be appropriately determined by suitably excluding the cases in which the opening degree of the EGR valve 22 becomes greater than the learning value Lθij by at least the predetermined threshold value Δθij due to an abnormality other than the abnormality in the cooling device 24. Accordingly, the diagnosis accuracy of the existence or nonexistence of the abnormality can be improved.

(4) The multiple operation areas, in which the opening degree of the EGR valve 22 becomes equal to or greater than a predetermined value, are used as the learning operation areas Aij for the diagnosis. Thus, the areas, in which the response of the measurement value of the airflow meter 30 with respect to the degradation of the cooling performance is good, can be easily specified. As a result, the accuracy of the diagnosis of the existence or nonexistence of the abnormality can be improved with a simple method.

(5) The map data for determining the manipulated variable of the EGR valve 22 for the open-loop control of the EGR quantity are employed. Thus, the EGR quantity can be controlled even when the feedback control of the EGR quantity cannot be executed.

Next, abnormality diagnosis according to a second example embodiment of the present invention will be explained with reference to FIG. 9.

In this example embodiment, existence or nonexistence of an abnormality in the cooling device 24 is diagnosed based on comparison between the target value and the measurement value of the air intake quantity at the time when the opening degree of the EGR valve 22 is controlled to the above-mentioned standard value of the corresponding operation area.

Figure 9:
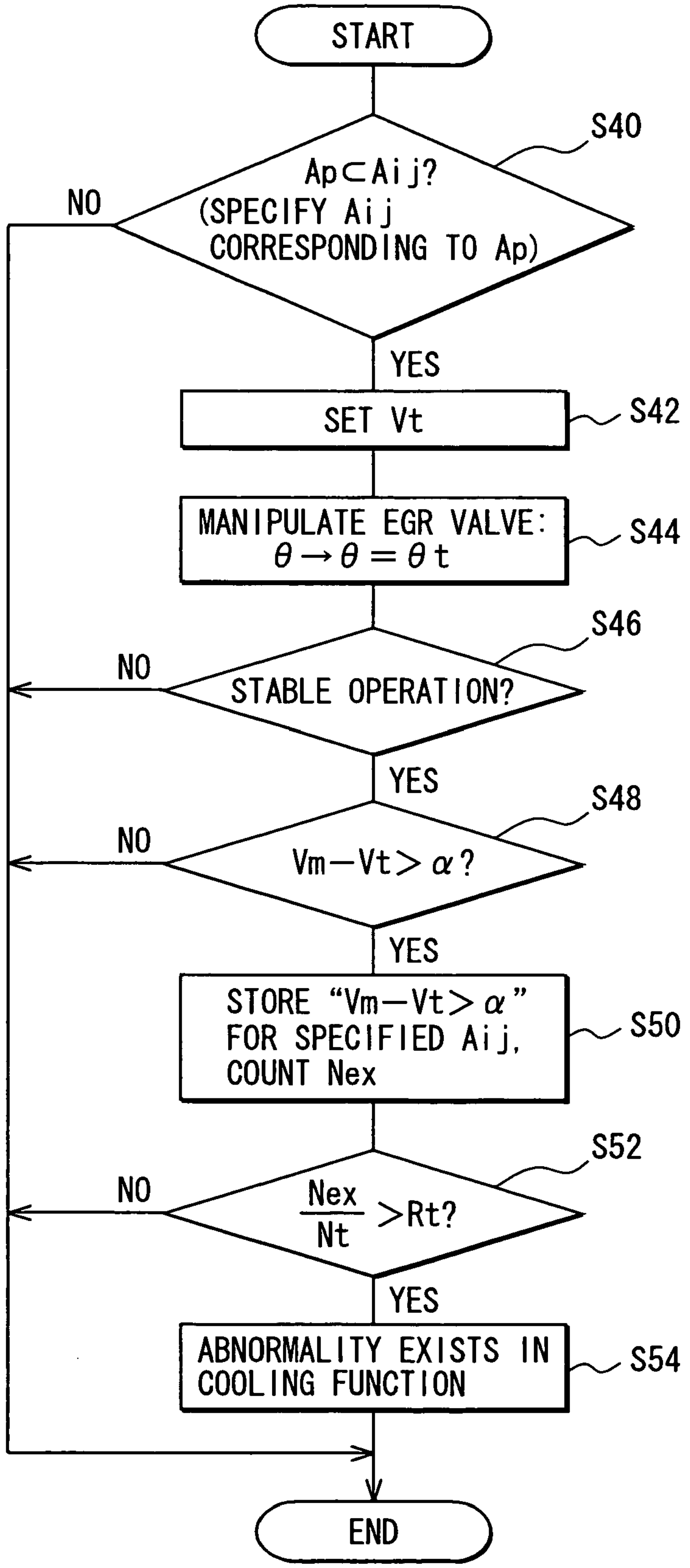
FIG. 9 is a flowchart showing processing steps of abnormality diagnosis according to a second example embodiment of the present invention.

A flowchart of processing steps of the diagnosis according to the second example embodiment is shown in FIG. 9. The electronic control device 40 repeatedly executes the processing steps shown in FIG. 9 in a predetermined cycle, for example.

Figure 6:
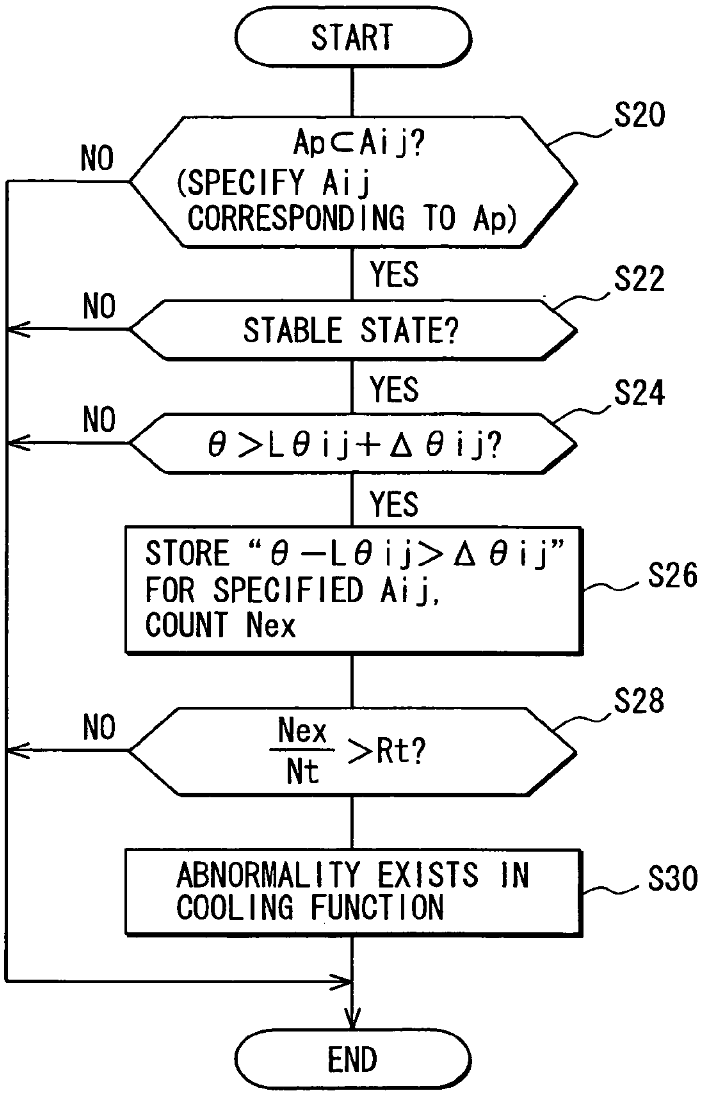
FIG. 6 is a flowchart showing processing steps of the abnormality diagnosis according to the first example embodiment.

First, in this series of processing, Step S40 specifies the operation area Aij corresponding to the present operation area Ap of the engine 2 like Step S20 of the flowchart shown in FIG. 6. Following Step S42 sets the target value Vt of the air intake quantity in accordance with the operation area Aij of the engine 2 like Step S2 of FIG. 2. Following Step S44 operates the EGR valve 22 to conform the opening degree θ of the EGR valve 22 to a standard value θt of the operation area Aij. The manipulation command value of the EGR valve 22 or the measurement value of the opening degree θ of the EGR valve 22 provided by the sensor incorporated in the EGR valve 22 may be conformed to the standard value θt.

Following Step S46 determines whether the operating state of the engine 2 is stable like Step S22 of the flowchart shown in FIG. 6. If Step S46 determines that the operating state is stable, Step S48 compares the measurement value Vm of the air intake quantity (measurement value provided by the airflow meter 30) with the target value Vt. For example, Step S48 determines whether a value provided by subtracting the target value Vt from the measurement value Vm of the air intake quantity is greater than a predetermined threshold value α.

At this time, the EGR valve 22 is manipulated to conform the opening degree θ of the EGR valve 22 to the standard value θt of the operation area Aij. Therefore, if the cooling performance of the cooling device 24 is normal, the air intake quantity Vm should conform to the target value Vt. However, if the cooling performance of the cooling device 24 is degraded, the air intake quantity Vm will become greater than the target value Vt due to the decrease of the EGR quantity.

If the air intake quantity Vm is greater than the target value Vt by at least the predetermined value α at Step S48, the same processing as that of Steps S26 to S30 of the flowchart shown in FIG. 6 is performed at Steps S50 to S54.

The series of processing is ended once if Step S40 determines that the present operation area Ap is not included in the areas Aij, if Step S46 determines that the operating state is unstable, if Step S48 determines that the measurement value Vm is not greater than the target value Vt by at least the threshold value α, if Step S52 determines that the ratio Nex/Nt does not exceed the threshold value Rt, or if the processing at Step S54 is completed.

This example embodiment exerts effects similar to the effects (1) to (5) of the first example embodiment.

The first example embodiment stores the corrected amount provided by the feedback control of the opening degree of the EGR valve 22 based on the map data of the open-loop control, when storing the learning value used in the diagnosis of the existence or nonexistence of the abnormality. Alternatively, the opening degree of the EGR valve 22 provided by the feedback control itself may be stored.

The first example embodiment uses the learning value as the value to be compared with the measurement value of the opening degree of the EGR valve 22 in the diagnosis of the existence or nonexistence of the abnormality. Alternatively, the opening degree of the EGR valve 22 determined by the map data of the open-loop control may be used.

The effect (1) or (2) of the first example embodiment can be exerted by comparing the measurement value and the learning value of the opening degree of the EGR valve 22 in the first example embodiment even if the map data for the open-loop control are not provided.

The effect (1) or (2) of the first example embodiment can be exerted by determining that an abnormality exists if the measurement value of the opening degree of the EGR valve 22 is greater than the standard value by at least a predetermined value instead of performing the processing of Step S28 of the flowchart shown in FIG. 6.

The setting of the operation areas in which the measurement value and the standard value of the opening degree are compared is not limited to that described in the above example embodiments. The effect (1) or (2) of the first example embodiment can be exerted even in the case where the comparison is performed in the entire operation areas. However, it is preferable to set the areas, in which the change in the measurement value of the airflow meter 30 with respect to the change in the opening degree of the EGR valve 22 is relatively large.

Figure 10:
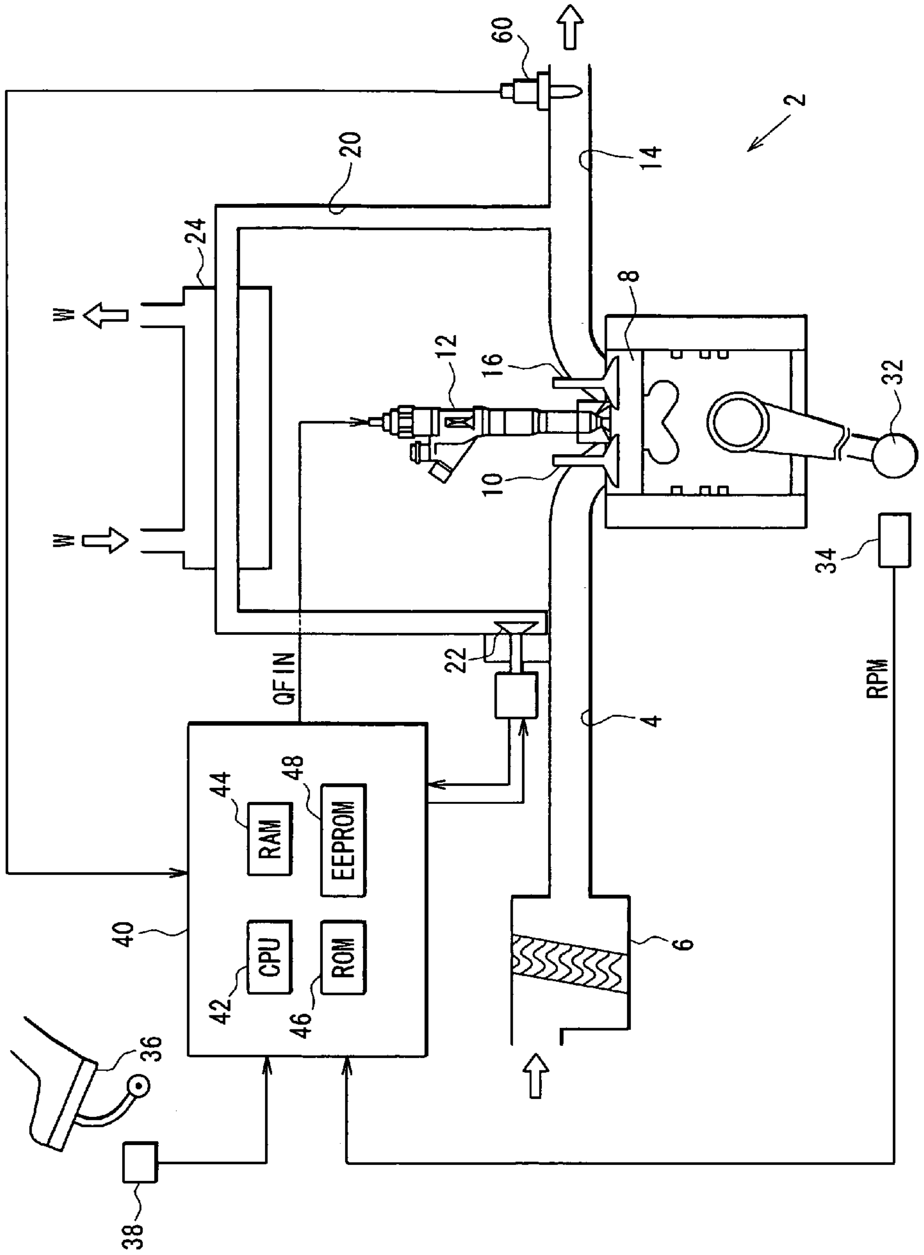
FIG. 10 is a schematic diagram showing an exhaust gas recirculation system of a modified example of the first or second example embodiment.
Figure 11:
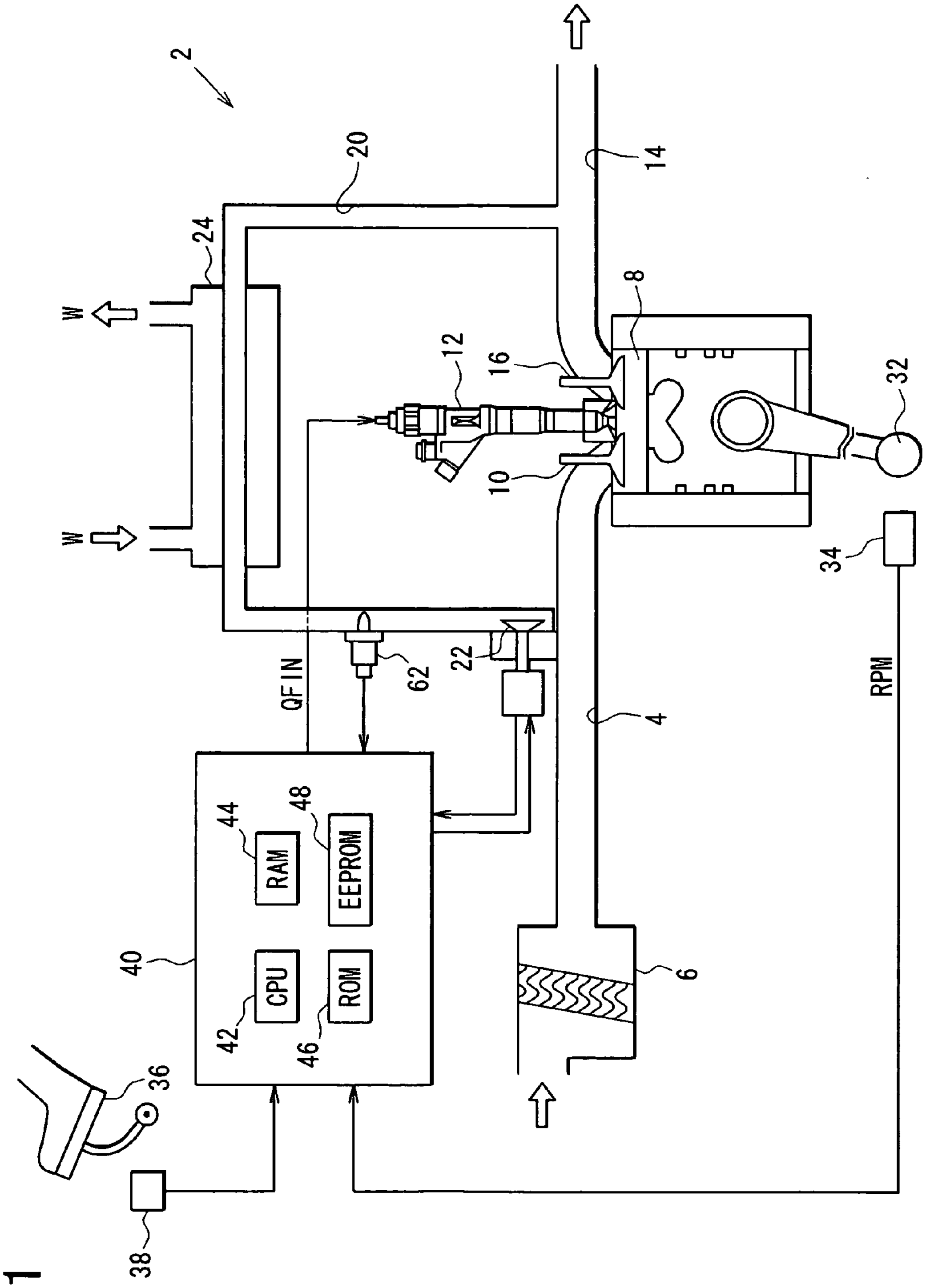
FIG. 11 is a schematic diagram showing an exhaust gas recirculation system of another modified example of the first or second example embodiment.

A gas quality of the exhaust gas may be controlled to an intended quality (target value) based on a measurement value of an oxygen sensor 60 as shown in FIG. 10 instead of feedback-controlling the air intake quantity. The oxygen sensor 60 measures an oxygen concentration in the exhaust gas in the exhaust passage 14. The EGR quantity may be directly feedback-controlled based on a measurement value of a flow rate sensor 62 that senses the EGR quantity as shown in FIG. 11. Also in these cases, the existence or nonexistence of an abnormality in the cooling device 24 can be diagnosed based on comparison between the measurement value of the oxygen sensor 60 or the flow rate sensor 62 and the target value.

A measurement value of an intake pressure sensor sensing a pressure in the intake system may be used as the state quantity of the fresh air taken through the intake system instead of the measurement value of the airflow meter.

A measurement value of a sensor sensing a concentration of nitrogen oxides may be used as the state quantity of the exhaust gas discharged to the exhaust system instead of the measurement value of the oxygen sensor.

The actuator for directly or indirectly feedback-controlling the EGR quantity (through the feedback control of the intake air, for example) is not limited to the EGR valve 22. For example, a device for electronically controlling a flow rate of the cooling water flowing through the cooling device 24 may be provided and used to manipulate the flow rate of the cooling water. In this case, existence or nonexistence of an abnormality can be diagnosed based on whether the manipulated variable of the device (flow rate of the cooling water) contains a component corresponding to a compensation for the reduction of the EGR quantity due to the degradation of the cooling performance of the cooling device 24.

The structure of the exhaust gas recirculation system or the diagnosis object of the abnormality diagnosis device of the exhaust gas recirculation system may be modified.

The present invention should not be limited to the disclosed embodiments, but may be implemented in many other ways without departing from the spirit of the invention.

What is claimed is:

1. An abnormality diagnosis device of an exhaust gas recirculation system recirculating exhaust gas, which is discharged to an exhaust system of an internal combustion engine, into an intake system, wherein the exhaust gas recirculation system has an actuator for adjusting a quantity of the recirculated exhaust gas and a cooling device for cooling the recirculated exhaust gas, the abnormality diagnosis device comprising:

a target value setting device that sets a target value of one of the quantity of the recirculated exhaust gas, a state quantity of fresh air suctioned from the intake system and a state quantity of the exhaust gas discharged to the exhaust system in accordance with each one of operation areas of the engine;

a standard value storing device that stores a standard value of a manipulated variable of the actuator corresponding to the operation area of the engine and the target value;

a measuring device that measures one of the quantity of the recirculated exhaust gas, the state quantity of the fresh air and the state quantity of the exhaust gas;

a calculating device that calculates a deviation between a measurement value of the measuring device and the target value; and a diagnosing device that diagnoses existence or nonexistence of an abnormality in the cooling device based on comparison between the manipulated variable, which is provided when the actuator is manipulated such that the deviation is less than a predetermined threshold value, and the standard value corresponding to the operation area of the engine, in which the manipulation of the actuator is performed.

2. The abnormality diagnosis device as in claim 1, wherein the diagnosing device diagnoses existence or nonexistence of an abnormality in the cooling device based on comparison between the manipulated variable, which is provided when the actuator is manipulated to conform the deviation to zero, and the standard value corresponding to the operation area of the engine, in which the manipulation of the actuator is performed.

3. The abnormality diagnosis device as in claim 1, wherein the standard value is the manipulated variable learned for each operation area when the actuator is manipulated such that the deviation is less than the predetermined threshold value.

4. The abnormality diagnosis device as in claim 1, wherein the standard value is the manipulated variable learned for each operation area when the actuator is manipulated to conform the deviation to zero.

5. The abnormality diagnosis device as in claim 1, wherein the diagnosing device determines that an abnormality exists in the cooling device if a difference between the manipulated variable, which is provided when the actuator is manipulated such that the deviation is less than the predetermined threshold value, and the standard value corresponding to the operation area, in which the manipulation of the actuator is performed, is greater than a predetermined value in a certain number of the operation areas or over.

6. The abnormality diagnosis device as in claim 1, wherein the diagnosing device determines that an abnormality exists in the cooling device if a difference between the manipulated variable, which is provided when the actuator is manipulated to conform the deviation to zero, and the standard value corresponding to the operation area, in which the manipulation of the actuator is performed, is greater than a predetermined value in a certain number of the operation areas or over.

7. The abnormality diagnosis device as in claim 1, wherein the measuring device measures an air intake quantity of the engine as the state quantity of the fresh air.

8. The abnormality diagnosis device as in claim 1, wherein the measuring device measures a gas quality of the exhaust gas discharged to the exhaust system of the engine as the state quantity of the exhaust gas.

9. The abnormality diagnosis device as in claim 1, wherein the actuator is a valve that adjusts a flow passage area of an exhaust gas recirculation passage connecting the exhaust system with the intake system.

10. An abnormality diagnosis device of an exhaust gas recirculation system recirculating exhaust gas, which is discharged to an exhaust system of an internal combustion engine, into an intake system, wherein the exhaust gas recirculation system has an actuator for adjusting a quantity of the recirculated exhaust gas and a cooling device for cooling the recirculated exhaust gas, the abnormality diagnosis device comprising:

a target value setting device that sets a target value of one of the quantity of the recirculated exhaust gas, a state quantity of fresh air suctioned from the intake system and a state quantity of the exhaust gas discharged to the exhaust system in accordance with each one of operation areas of the engine;

a standard value storing device that stores a standard value of a manipulated variable of the actuator corresponding to the operation area of the engine and the target value;

a measuring device that measures one of the quantity of the recirculated exhaust gas, the state quantity of the fresh air and the state quantity of the exhaust gas;

a calculating device that calculates a deviation between a measurement value of the measuring device and the target value; and a diagnosing device that diagnoses existence or nonexistence of an abnormality in the cooling device based on the deviation that is calculated when the actuator is manipulated to conform the manipulated variable of the actuator to the standard value corresponding to the operation area of the engine.

11. The abnormality diagnosis device as in claim 10, wherein the standard value is the manipulated variable learned for each operation area when the actuator is manipulated such that the deviation is less than a predetermined threshold value.

12. The abnormality diagnosis device as in claim 10, wherein the standard value is the manipulated variable learned for each operation area when the actuator is manipulated to conform the deviation to zero.

13. The abnormality diagnosis device as in claim 10, wherein the diagnosing device determines that an abnormality exists in the cooling device if the deviation calculated when the actuator is manipulated to conform the manipulated variable to the standard value is greater than a predetermined value in a certain number of the operation areas or over.

14. The abnormality diagnosis device as in claim 10, wherein the abnormality diagnosis device measures a command value of the manipulated variable of the actuator or a measurement value of a device, which measures operation of the actuator, as the manipulated variable of the actuator at the time when the actuator is manipulated to conform the manipulated variable to the standard value.

15. The abnormality diagnosis device as in claim 10, wherein the measuring device measures an air intake quantity of the engine as the state quantity of the fresh air.

16. The abnormality diagnosis device as in claim 10, wherein the measuring device measures a gas quality of the exhaust gas discharged to the exhaust system of the engine as the state quantity of the exhaust gas.

17. The abnormality diagnosis device as in claim 10, wherein the actuator is a valve that adjusts a flow passage area of an exhaust gas recirculation passage connecting the exhaust system with the intake system.

* * * * *